United States Patent [19]

Robbins et al.

[11] Patent Number: 4,842,621
[45] Date of Patent: Jun. 27, 1989

[54] RECOVERY PROCESS

[75] Inventors: Lanny A. Robbins; Herbert A. Johnson, both of Midland, Mich.

[73] Assignee: The Dow Chemical Company, Midland, Mich.

[21] Appl. No.: 30,183

[22] Filed: Mar. 26, 1987

[51] Int. Cl.$^4$ ............................................. B01D 53/04
[52] U.S. Cl. ................................. 55/26; 55/58; 55/62; 55/68; 55/71; 55/74; B01D/53/04
[58] Field of Search ................ 55/25, 26, 58, 62, 68, 55/71, 74

[56] References Cited

U.S. PATENT DOCUMENTS

| | | | |
|---|---|---|---|
| 2,910,137 | 10/1959 | Victor | 55/74 X |
| 3,085,379 | 4/1963 | Kiyonaga et al. | 55/58 X |
| 3,089,250 | 5/1963 | Victro | 55/74 X |
| 3,477,206 | 11/1969 | Russell | 55/62 |
| 3,717,974 | 2/1973 | Batta | 55/62 X |
| 3,948,622 | 4/1976 | Tsao | 55/71 X |
| 4,013,429 | 3/1977 | Sircar et al. | 55/33 |
| 4,056,369 | 11/1977 | Quackenbush | 55/58 |
| 4,066,423 | 1/1978 | McGill et al. | 55/58 X |
| 4,077,779 | 3/1978 | Sircar et al. | 55/25 |
| 4,077,780 | 3/1978 | Doshi | 55/26 |
| 4,104,039 | 8/1978 | Kuri et al. | 55/58 X |
| 4,171,206 | 10/1979 | Sircar | 55/58 X |
| 4,171,207 | 10/1979 | Sircar | 55/26 |
| 4,261,716 | 4/1981 | Schwartz et al. | 55/179 X |
| 4,276,058 | 6/1981 | Dinsmore | 55/62 X |
| 4,305,734 | 12/1981 | McGill | 55/62 X |
| 4,331,456 | 5/1982 | Schwartz et al. | 55/26 |
| 4,338,101 | 7/1982 | Tuttle | 55/58 X |
| 4,343,629 | 8/1982 | Dinsmore et al. | 55/58 X |
| 4,359,328 | 11/1982 | Wilson | 55/26 |
| 4,376,640 | 3/1983 | Vo | 55/26 |
| 4,421,532 | 12/1983 | Sacchetti et al. | 55/58 X |
| 4,462,811 | 7/1984 | Dinsmore et al. | 55/58 X |
| 4,515,605 | 5/1985 | Inoue et al. | 55/26 |
| 4,528,000 | 7/1985 | McGill et al. | 55/58 X |
| 4,599,094 | 7/1986 | Werner et al. | 55/58 X |
| 4,670,028 | 6/1987 | Kennedy | 55/58 X |

Primary Examiner—Robert Spitzer
Attorney, Agent, or Firm—Charles J. Enright

[57] ABSTRACT

The present invention provides a process for separating a condensable gas from a non-condensable gas by switching at least three adsorber beds which preferentially adsorb the condensable gas serially through the following steps:

(a) an adsorption step in which a mixture of the condensable and non-condensable gases are passed through the bed and the separated non-condensable gas is withdrawn therefrom;

(b) a supercharging step in which a stream relatively rich in the condensable gas is passed through the bed, the stream having an actual volume at least three times that necessary to displace a void volume of the bed;

(c) a desorption step in which a vacuum is drawn on the bed and an amount of a non-condensable gas is bled through the bed;

and wherein the non-condensable gas in conjunction with entrained condensable gas from step (c) is passed into a vacuum pump, is compressed, at least some of the condensable gas is condensed and at least part of the non-condensable gas and remaining condensable gas is the passed to step (b) as the stream relatively rich in the condensable gas;

and such that continuous operation of the process with at least one of the beds in the adsorption step is permitted.

In an example 1,1,1-trichloroethane is separated from air.

10 Claims, 1 Drawing Sheet

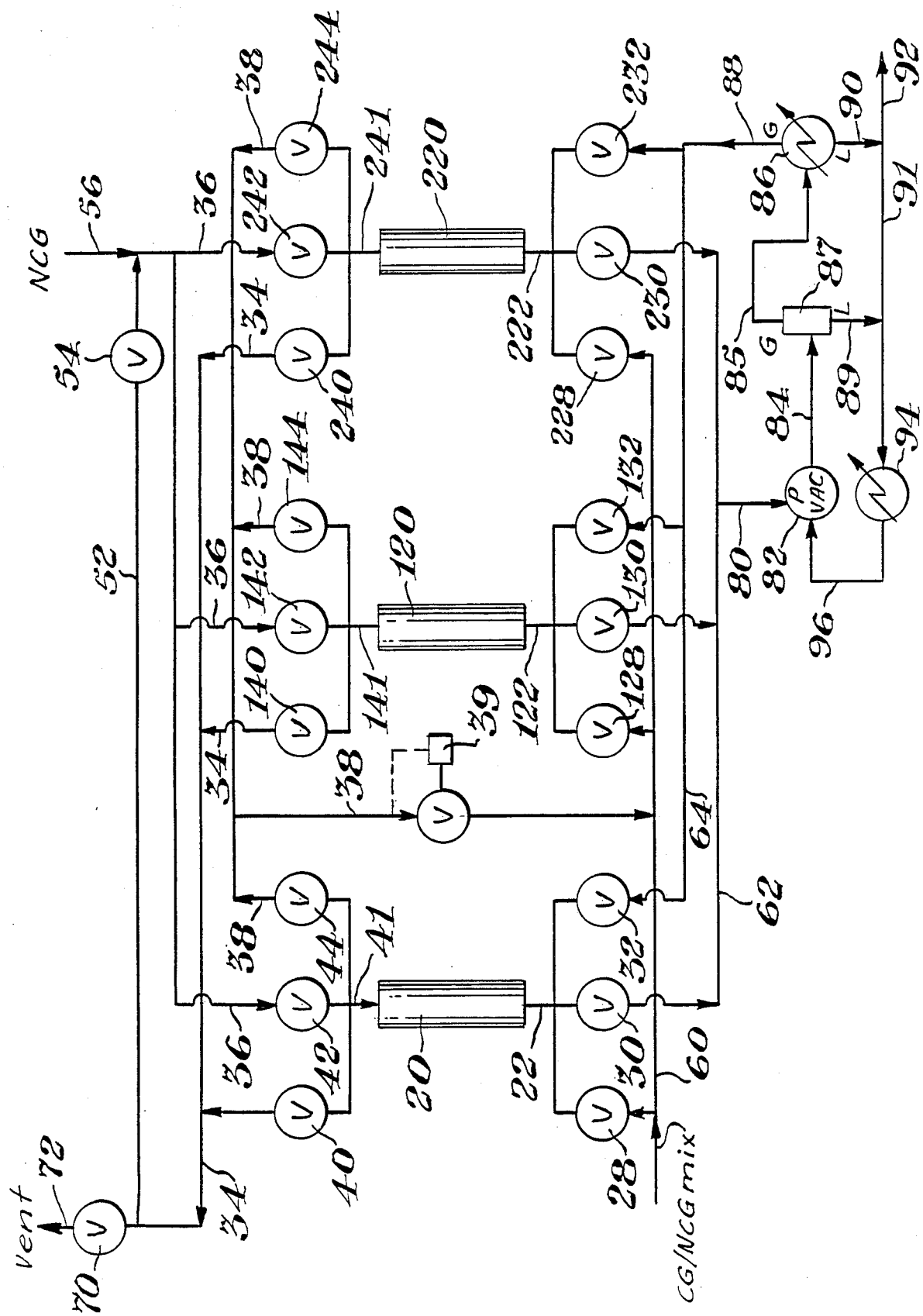

4,842,621

RECOVERY PROCESS

FIELD OF THE INVENTION

The present invention relates generally to the separation of a condensable gas from a non-condensable gas by adsorption of the condensable gas on a solid adsorbent.

BACKGROUND

In many industrial processes mixtures of air and condensable vaporous materials such as gasoline, halogenated hydrocarbon solvents and the like are produced. It is ordinarily economically and ecologically desirable to recover the condensable vaporous materials for disposal or for reuse.

There are a number of different approaches used commercially to collect and recover these vapors. One of the preferred approaches involves the use of activated carbon adsorber beds. Plural beds are used so that one bed may be regenerated while the other bed is on-stream performing its adsorption function.

The usual adsorption system of this type comprises two or more adsorber vessels containing an activated carbon adsorbent. The adsorbable gas-laden air to be treated is passed through a bed of adsorbent. The adsorbable components are adsorbed and the purified air is vented to the atmosphere. When the adsorbent has adsorbed substantial adsorbable components, the influx of the adsorbable component-laden air is terminated and the adsorbed component is driven off by heating (temperature swing) and/or applying a vacuum (pressure swing) to the adsorbent bed. A purge gas may be bled through the bed being desorbed. The purge gas/adsorbable component mixture is then separated by a second technique such as condensation and the remaining adsorbable component contaminated purge gas is recycled to a bed in the adsorption step. The condensed adsorbable gas is then recovered.

U.S. Pat. No. 4,305,734, which is incorporated herein by reference, discloses a system wherein a hydrocarbon, e.g. methane, is adsorbed onto an activated carbon. Methane is used to displace the air in the bed that is being desorbed so that the hydrocarbon recovered will not be contaminated with air when desorbed. Just enough methane is used to displace one actual void volume of the adsorbent bed. An "actual void volume" is the amount of a gas required to just displace the gas in the adsorbent bed at the actual pressure at which the bed happend to be.

U.S. Pat. Nos. 4,066,423; 4,261,716; 4,276,058; and 4,462,811, all of which are incorporated herein by reference, disclose a system wherein the gas mixture from the desorption step is passed through a liquid absorber and then through a second adsorber to remove traces of remaining adsorbable components. Improvements cited in some of these patents include bleeding of the non-adsorbable gas (air) through the desorbing bed, use of a liquid ring vacuum pump, manipulation of the circulation rate in the absorber to maximize absorption and so on. A disadvantage of these processes is that a second type of apparatus with its own separate and distinct problems is used.

SUMMARY OF THE INVENTION

The present invention provides a process for separating a condensable gas from a non-condensable gas by switching at least three adsorber beds which preferentially adsorb the condensable gas serially through the following steps:

(a) an adsorption step in which a mixture of the condensable and non-condensable gases are passed through the bed and the separated non-condensable gas is withdrawn therefrom;

(b) a supercharging step in which a stream relatively rich in the condensable gas is passed through the bed, said stream having an actual volume at least three times that necessary to displace a void volume of the bed;

(c) a desorption step in which a vacuum is drawn on the bed and an amount of a non-condensable gas is bled through the bed;

and wherein said non-condensable gas in conjunction with entrained condensable gas from step (c) is passed into a vacuum pump, is compressed, at least some of the condensable gas is condensed and at least part of the non-condensable gas and remaining condensable gas is then passed to step (b) as the stream relatively rich in the condensable gas;

and such that continuous operation of the process with at least one of the beds in the adsorption step is permitted.

A feature of the invention is the supercharging step in which a stream relatively rich in the condensable gas is passed through the bed, said stream having an actual volume at least three times that necessary to displace a void volume of the bed.

An advantage of the invention is that a smaller amount of condensable gas is recycled to the bed in the adsorption step than if the supercharging step is not inserted. Also additional different apparatus such as a liquid absorber is not used. Efficiencies of 90% and even 95 or 98% are possible depending on the conditions.

BRIEF DESCRIPTION OF THE DRAWING

The singe drawing FIGURE is a schematic process flow diagram of one embodiment of the invention.

PREFERRED EMBODIMENTS

The invention is a process for separating a condensable from the non-condensable gas. The condensable gas is designated in this application as CG. The non-condensable gas is designated NCG. Broadly, the CG differs from a NCG in that a CG boils at a temperature at lest 500° C. greater than the NCG. Preferably, the boiling point of the CG should be at least 100° C. greater than the NCG. Preferably the CG has a boiling point of greater than $-50°$ C., more preferably greater than 0° C., and most preferably greater than 50°0 C. For a given process the CG should be preferentially adsorbed by the adsorbent.

Preferably, the NCG is oxygen, nitrogen, carbon dioxide or a mixture of these such as air. The CG may be a hydrocarbon, such as any individual hydrocarbon preferably having four or more carbon atoms, or a mixture of hydrocarbons such as gasoline, or halogenated solvents such as carbon tetrachloride. Preferred and exemplary is 1,1,1-trichloroethane (TCA).

The adsorbent is a high surface area solid which preferentially adsorbs the CG. Exemplary is activated carbon which preferentially adsorbs both hydrocarbons and halogenated solvents.

Referring now to FIG. 1 which contains an exemplary apparatus for carrying out the process of the invention, conduit 60 is connected at one end to a source for a mixture of the CG and NCG. In the exemplary process this is a mixture of air contaminated with 1,1,1-trichoroethane (TCA).

The FIGURE shows three adsorber beds 20, 120 and 220. The adsorbers are of conventional design. They may each be provided with internal adsorbent support baffles or plates, gas flow directing baffles, pressure relief valves and pressure and temperature indicators conventionally employed with solid adsorbent devices. For purposes of simplification these conventional devices are not shown.

These three beds are equivalent and equivalent parts have been labeled with equivalent numbers except that the second bed is 120 instead of 20 and the third bed is 220 instead of 20. This numeric theme is carried out throughout the numbering system. For example, valve 28 which is the inlet valve to the adsorber bed 20 is equivalent to valve 128 which is the inlet valve to adsorber bed 120, which is equivalent to valve 228 which is the inlet valve to adsorber bed 220. Accordingly, the reference to valve 28 can also be taken as a reference to valves 128 and 228 and likewise through the components of each of the adsorber beds.

Inlet valve 28 is connected to conduit 60 which is connected to the source of the CG/NCG mixture. When valve 28 is open, it permits this mixture to enter the inlet conduit 22, to the adsorber bed 20. In the adsorption step, valve 28 is open to permit the flow from conduit 60 into the adsorber bed. Valve 40 is also open. Valve 40 permits flow from the outlet conduit 41 of bed 20 to the conduit 34, which connects the adsorber bed to the vent valve 70 and the vent 72. When open these valves permit the NCG which has been separated from the CG to exit the apparatus. In the specific example of the invention, the separated gas is air and can be vented directly to the atmosphere.

Not shown in the drawing is conventional apparatus for determining when the adsorber bed 20 is to be switched to a different step of operation. The bed is switched prior to the breakthrough of CG but preferably not substantially before that time. Exemplary methods for determining the time to switch are the use of timing mechanisms. A typical cycle is determined by trial and error. Then that cycle time is programmed, usually with a computer controller. Other means include temperature sensors, which can sense the thermal front accompanying adsorption by the carbon in the bed, concentration sensors or thermal conductivity sensors, which measure the fact that CG has been adsorbed on the carbon in the bed or is breaking through into the effluent.

When the bed 20 has adsorbed the appropriate level of CG, it is switched into the supercharging step. Valve 28 and 40 are closed in the supercharging step. A stream relatively rich in CG is passed through the bed. The source of this stream relatively rich in CG is the outlet 88 to the condenser 86. The stream passes through conduit 64 through valve 32 which is open during this supercharging step through the inlet 22 and into bed 20. After adsorption of the CG, the stream now containing a lower concentration of CG passes out of the bed through outlet 41 and through valve 44 into conduit 38. From conduit 38 it may pass to the atmosphere (not shown) or it may pass through a pressure let-down valve 39. The pressure let-down valve 39 controls the relationship of the pressure in conduit 38 and thus in bed 20 in relation to the pressure in conduit 60. When the stream passes into conduit 60 it is recycled into whichever bed is in the adsorption step.

The force driving the stream relatively rich in CG is pump 82 which raises the pressure of said stream preferably above that in line 60 and the bed that is in the adsorption stage. Preferably, in addition to being higher than the pressure in the bed that is in the adsorption stage, the bed undergoing the supercharging step has a pressure of from about 16 to about 25 psia. This increase in pressure increases the adsorptive capacity of the carbon in bed 20 which is in the supercharging step.

During the supercharging step the stream relatively rich in CG passing through the bed has an actual volume at least three times that necessary to displace the actual void volume of the bed. By actual is meant the volume passing through the bed at the pressure at which the bed happens to be. By void is meant the space in the adsorber bed other than that occupied by the particles of the adsorbent. Preferably, at least 10 actual void volumes of this stream pass through the bed, more preferably at least 50 and most preferably at least 100 actual void volumes pass through the bed during the supercharging step.

The determining factor in the volume of gas mixture going through the bed in the supercharging step is the amount of CG/NCG mixture coming from condenser 86 which is a residual stream after condensation of the CG removed from the bed being desorbed in the third or desorption step.

Once the bed 20 completes the supercharging step the valves 32 and 44 are closed. Preferably, valve 44 is closed after valve 32 so that the bed 20 has a pressure of about the pressure undergoing the adsorption step. In order to switch the bed 20 to the third or desorption step, valve 30 is opened. The opening of valve 30 permits the CG/NCG mix in bed 20 to exit through the inlet 22, through the valve 30 and into conduit 62. From conduit 62, the stream passes into the vacuum pump 82 through inlet 80.

During the course of the desorption step, after a vacuum has been drawn on bed 20, valve 42 is opened so that an amount of NCG can be bled through the bed 20. The bleed stream may be started simultaneously with drawing of the vacuum, but preferably is started after substantial lowering of the pressure in the bed. The NCG can be a recycle stream from the vent 34 through conduit 52 and valve 54 and conduit 36 or could be some other source 56 of NCG such as the atmosphere. The NCG passes from conduit 36 through the valve 42 and into the bed 20 through the outlet 41. The combination of the vacuum and the NCG being bled through the bed, acts to desorb the CG from the activated carbon in the bed.

This CG/NCG mix passes through inlet 22 and valve 30 into conduit 62 and the vacuum pump 82 through inlet 80. From there the pressure is raised in the pump 82 and the stream exits the vacuum pump 82 through outlet conduit 84. The compressed stream passes into the gas/liquid separator 87. The liquid passes through conduit 89 either through conduit 91 to cooler 94 and back to the pump 82 thorugh conduit 96 as sealant or through conduit 92 to storage. The recycle stream is advantageous when the pump 82 is a liquid ring vacuum pump as it supplies both the sealant fluid for the pump and cooling for the incoming CG/NCG mix. The vapor stream from the gas/liquid separator 87 passes through conduit 85 to condenser 86. The increased pressure plus the cooling effect of the condenser 86 condenses at least a portion of the CG which then passes through conduit 90 and 92 to storage or through conduit 91 to cooler 94.

A gas stream relatively rich in the CG exits the condenser 86 through conduit 88 from where it passes into the bed which in undergoing the supercharging step. Preferably, the pressure in the bed undergoing the desorption step is from about 50 to about 350 torr. If the condensed CG is used as a sealant fluid for a liquid ring pump, the minimum pressure attainable would be the vapor pressure of the CG at the temperature of operation of the liquid ring pump which is drawing the vacuum.

Preferably, sufficient NCG is bled through the bed 20 in the desorption step to regenerate the bed. It is also necessary to accomplish the goal of passing the actual void volumes through the bed undergoing the supercharging step stated in the description of that step. NCG sufficient to regenerate the bed gernerally is sufficient to pass the actual void volumes through the bed undergoing the supercharging step.

Recalling that numbers which differ only in the third digit from the right designate equivalent parts in each bed, one can see that one of the beds 20, 120 or 220 can be going through each of the three steps concurrently.

With three beds it is possible to have one of the beds in the adsorption step at any given time. This does not mean that one of the beds is continuously held in the adsorption step, just that one of the three is available but not always the same one. It is not necessary that all three beds be in a step other than the adsorption step at any time during the process.

EXAMPLE

Three beds are operated concurrently. Each bed is charged with 670 grams of 4 to 10 mesh Calgon BPL carbon. Each bed is 24 inches long and 2 inches in diameter.

The first bed 20 goes through the adsorption step at a pressure of 14.7 psia or normal atmospheric at a flow rate of 0.9 actual cubic feet per minute (ACFM). The fresh feed from the source of air/TCA is 0.55 ACFM at 22° C. and 14.7 psia. It contains 700 parts per million TCA by volume, that is approximately 4 grams per hour TCA. This combines with 0.35 ACFM of a recycled stream at adsorber pressure and makes 0.9 ACFM going to the bed 20 in the adsorption step. This yields a $v_f$ of 0.7 feet per second. $V_f$ is the face velocity or the superficial gas velocity.

The CG in the mix is 1,1,1-trichloroethane (TCA) and the NCG is air. The TCA-air mixture passes through conduit 60 and valve 28 into bed 20. The separated air passes out through outlet 41, valve 40 and conduit 34 through the vent valve 70 through vent 72. It contains 35±10 ppm TCA.

While bed 20 undergoes the adsorption step, bed 120 undergoes the supercharging step. It operates at a pressure of 16-19 psia. The bed temperature is 20°-30° C. The condenser temperature is 0° C. 0.3 ACFM of the stream relatively rich in CG, or TCA in the example, containing 4 volume percent TCA, pases into the bed 120 through conduit 64, valve 132 and inlet 122. The separated NCG or air passes through the outlet 141 and through valve 144 into conduit 38. It continues on through pressure let-down valve 39 where after going through the let-down valve it has a rate of 0.35 ACFM and is recycled through conduit 60 and valve 28 into the bed 20 in the adsorption step.

The third bed going through the desorption step, in the example, bed 220, operates at a pressure of 3.4 psia or 175 torr. For the first portion of the desorption step no backpurge is used. In the example with a two minute desorption step no backpurge is used for 20 seconds and backpurge is used for the balance. 1.6 ACFM at 3.4 psia of air from source 56 passes through conduit 36, through valve 242 and outlet 241 into bed 220. This is the back purge of NCG. This stream passes out through inlet 222, valve 230, into conduit 62 where it is drawn into inlet 80 to vacuum pump 82.

The pump is a Croll-Reynolds CP-21 three cubic feet per minute two stage liquid ring vacuum pump. The pump 82 raises the pressure from 3.4 psia in the inlet 80 up to pressures approaching 19 psia in the outlet 84. The compressed stream passes into the gas/liquid separator 87. The liquid passes through conduit 89 either through conduit 91 to cooler 94 and back to the pump 82 through conduit 96 as sealant or through conduit 92 to storage. The vapor stream from the gas/liquid separator 87 passes through conduit 85 to condenser 86. The increased pressure plus the cooling effect of the condenser 86 condenses at least a portion of the TCA which then passes through conduit 90 and 92 to storage or through conduit 91 to cooler 94.

The air and remaining TCA is then passed to step (b) as the stream relatively rich in TCA. Any gaseous mixture leaves the condenser 86 through outlet 88 and passes into conduit 64 where it passes through valve 132 and inlet 122 into bed 120 which is in the supercharging stage.

The beds may serially pass through a fourth step after the desorption step takes place. Valve 230 is closed while valve 242 is left open. This permits the repressuring of bed 220 to atmospheric or 14.7 psia before it is passed into the adsorption step. The gas, as with the purge, may be a recycle stream from the vent or it may be NCG or air from the source 56 such as the atmosphere. When the bed is repressured, vavle 242 is closed and bed 220 stands by until it is switched into the adsorption step.

This experimental apparatus is operated for two minutes between switches between steps. This permits a six minute total cycle time from beginning of one adsorption step to the beginning of the next adsorption step for a given bed. Under appropriate conditions, similar to those described, one may obtain an efficiency of 92% removal of TCA from air. One skilled in the art will recognize that efficiency is a product of many factors and as conditions change so will efficiency.

It is understood that the invention has been described with reference to specific illustrative embodiments and the foregoing description is not to be construed in a limiting sense.

What is claimed is:

1. A process for separating a condensable gas from a non-condensable gas comprising switching at least three adsorber beds which preferentially adsorb the condensable gas serially through the following steps:
   (a) an adsorption step in which a mixture of the condensable and non-condensable gases are passed through the bed and the separated non-condensable gas is withdrawn therefrom;
   (b) a supercharging step in which a stream relatively rich in the condensable gas is passed through the bed, said stream having an actual volume at least three times that necessary to displace a void volume of the bed and wherein a pressure in the bed undergoing step (b) is elevated over that in the bed undergoing step (a);

(c) a desorption step in which a vacuum is drawn on the bed and an amount of non-condensable gas is bled through the bed; and wherein said non-consensable gas in conjunction with entrained condensable gas from step (c) is passed into a vacuum pump, is compressed, at least some of the condensable gas is condensed and at least part of the non-condensable gas and remaining condensable gas is then passed to step (b) as the stream relatively rich in the condensable gas;

and such that continuous operation of the process with at least one of the beds in the adsorption step is permitted.

2. The process of claim 1 wherein the adsorber beds are additionally passed serially through a fourth step comprising:

(d) a repressurization step in which the pressure in the bed is raised to about the pressure of step (a) with clean non-condensable gas.

3. The process of claim 1 wherein a pressure in the bed undergoing step (a) is from about 12 to about 16 psia.

4. The process of claim 1 wherein a pressure in the bed undergoing step (b) is from about 16 to about 25 psia.

5. The process of claim 1 wherein a pressure in the bed undergoing step (c) is from about 50 to about 350 torr.

6. The process of claim 1 wherein a pressure in the bed undergoing step (c) is about the vapor pressure of the condensable gas at the temperature of operation of a vacuum pump which is drawing the vacuum of step (c).

7. The process of claim 1 wherein a liquid ring vacuum pump is used to draw the vacuum of step (c).

8. The process of claim 1 wherein the condensable gas is a chlorinated hydrocarbon.

9. The process of claim 1 wherein the condensable gas is 1,1,1-trichloroethane.

10. The process of claim 1 wherein the non-condensable gas is air.

* * * * *

UNITED STATES PATENT AND TRADEMARK OFFICE
CERTIFICATE OF CORRECTION

PATENT NO. : 4,842,621

DATED : June 27, 1989

INVENTOR(S) : Lanny A. Robbins and Herbert A. Johnson

It is certified that error appears in the above-identified patent and that said Letters Patent is hereby corrected as shown below:

On the title page, in the ABSTRACT, subparagraph (c) the line beginning with " remaining condensable gas is the " should correctly read -- remaining condensable gas is then --.

Column 1, line 50, " bed happend to be" should correctly read -- bed happens to be--.

Column 2, line 41, " The singe drawing " should correctly read -- The single drawing --.

Column 2, line 51, " at lest 500° C " should correctly read -- at least 50C° --.

Column 2, line 55, " preferably greater than 50°0 C " should correctly read -- preferably greater than 50° C --.

Column 4, line 63, " 82 thorugh conduit " should correctly read -- 82 through conduit --.

Column 5, line 20, "the bed gernerally " should correctly read -- the bed generally --.

Column 5, line 63, " pases into the bed " should correctly read --passes into the bed --.

UNITED STATES PATENT AND TRADEMARK OFFICE
CERTIFICATE OF CORRECTION

PATENT NO. : 4,842,621

DATED : June 27, 1989

INVENTOR(S) : Lanny A. Robbins and Herbert A. Johnson

It is certified that error appears in the above-identified patent and that said Letters Patent is hereby corrected as shown below:

Column 6, line 41, " vavle 242 " should correctly read -- valve 242 --.

Signed and Sealed this

Third Day of November, 1992

Attest:

DOUGLAS B. COMER

*Attesting Officer*    *Acting Commissioner of Patents and Trademarks*